(12) United States Patent
Oka et al.

(10) Patent No.: US 9,836,548 B2
(45) Date of Patent: Dec. 5, 2017

(54) MIGRATION OF TAGS ACROSS ENTITIES IN MANAGEMENT OF PERSONAL ELECTRONICALLY ENCODED ITEMS

(75) Inventors: Anand Ravindra Oka, Waterloo (CA); Sean Bartholomew Simmons, Waterloo (CA); Christopher Harris Snow, Kitchener (CA); Steven Michael Hanov, Waterloo (CA); Ghasem Naddafzadeh Shirazi, Vancouver (CA)

(73) Assignee: BlackBerry Limited, Waterloo, Ontario (CA)

( * ) Notice: Subject to any disclaimer, the term of this patent is extended or adjusted under 35 U.S.C. 154(b) by 246 days.

(21) Appl. No.: 13/600,673

(22) Filed: Aug. 31, 2012

(65) Prior Publication Data

US 2014/0067807 A1    Mar. 6, 2014

(51) Int. Cl.
*G06F 17/30* (2006.01)

(52) U.S. Cl.
CPC ................................ *G06F 17/3089* (2013.01)

(58) Field of Classification Search
CPC .............. G06F 17/3071; G06F 17/864; G06F 17/30598
USPC ....... 707/737, 702, 100, 748, 738, 827, 736, 707/791, 10, 805; 715/771, 753; 725/131
See application file for complete search history.

(56) References Cited

U.S. PATENT DOCUMENTS

| 5,729,471 | A * | 3/1998 | Jain et al. ..................... 725/131 |
| 6,460,036 | B1 * | 10/2002 | Herz ............................. 707/748 |
| 6,633,878 | B1 * | 10/2003 | Underwood ........... G06Q 10/10 |
| 7,269,546 | B2 | 9/2007 | Stensmo |
| 7,457,768 | B2 | 11/2008 | Horvitz et al. |
| 7,640,409 | B1 * | 12/2009 | Stafford et al. ............... 711/162 |
| 7,685,158 | B2 * | 3/2010 | Pilgrim et al. ......... 707/999.107 |
| 7,752,534 | B2 | 7/2010 | Blanchard, III et al. |
| 7,822,726 | B1 * | 10/2010 | Cardin .......................... 707/702 |

(Continued)

OTHER PUBLICATIONS

Tanguay, D., Sort by subject in Google Images, http://googleblog.blogspot.com/2011/05/sort-by-subject-in-google-images.html, May 9, 2011.

(Continued)

*Primary Examiner* — Jeffrey A Burke
*Assistant Examiner* — Thong Vu
(74) *Attorney, Agent, or Firm* — Jon Gibbons; Fleit Gibbons Gutman Bongini & Bianco P.L.

(57) ABSTRACT

A method performed on an electronic device for migrating tags across entities. The migration of the tags is performed following an analysis of one or more personal electronically encoded items associated with a previously created perspective or album associated with the previously created perspective, responsive to a user decision the creation of a new perspective, a new album associated with one of the previously created perspectives, or a new perspective and a new album associated with the new perspective, responsive to a user decision to treat the previously created perspective or album as an individual entity, and association of the previously created perspective or album with the new perspective or new album. The tags are respectively migrated from the new perspective or the new album to the associated previously created perspective or the previously created album and to associated ones of the one or more personal electronically encoded items.

21 Claims, 9 Drawing Sheets

(56) References Cited

U.S. PATENT DOCUMENTS

| | | | |
|---|---|---|---|
| 8,014,608 B2 | 9/2011 | Adams et al. | |
| 8,150,880 B2* | 4/2012 | Heo et al. | 707/791 |
| 8,175,420 B2 | 5/2012 | Sposato et al. | |
| 8,176,094 B2 | 5/2012 | Friedman | |
| 8,635,243 B2 | 1/2014 | Phillips et al. | |
| 8,666,807 B1* | 3/2014 | Murray | G06Q 30/0241 705/14.4 |
| 8,910,044 B1* | 12/2014 | Emigh | 715/716 |
| 2001/0027455 A1* | 10/2001 | Abulleil | G06Q 10/06 |
| 2003/0126136 A1* | 7/2003 | Omoigui | G06F 17/3089 |
| 2004/0034537 A1* | 2/2004 | Gengarella | G06Q 30/02 705/5 |
| 2004/0163029 A1* | 8/2004 | Foley et al. | 714/769 |
| 2005/0060643 A1* | 3/2005 | Glass | G06F 17/241 715/205 |
| 2005/0105805 A1* | 5/2005 | Nicponski | G06K 9/6211 382/216 |
| 2005/0117031 A1 | 6/2005 | Russon et al. | |
| 2006/0031235 A1* | 2/2006 | Foresti et al. | 707/100 |
| 2006/0206505 A1* | 9/2006 | Hyder | G06Q 10/10 |
| 2006/0210138 A1 | 9/2006 | Hilton et al. | |
| 2006/0248165 A1* | 11/2006 | Sridhar | H04L 41/5003 709/218 |
| 2007/0033537 A1 | 2/2007 | Mander et al. | |
| 2007/0192681 A1* | 8/2007 | Rashid et al. | 715/513 |
| 2007/0292021 A1* | 12/2007 | Caruso | H04N 7/17318 382/166 |
| 2008/0091526 A1 | 4/2008 | Shoemaker | |
| 2008/0189638 A1* | 8/2008 | Mody et al. | 715/771 |
| 2008/0215979 A1 | 9/2008 | Clifton et al. | |
| 2008/0228775 A1* | 9/2008 | Abhyanker et al. | 707/10 |
| 2008/0235177 A1* | 9/2008 | Kim | G06Q 40/00 |
| 2008/0298766 A1 | 12/2008 | Wen et al. | |
| 2008/0312934 A1 | 12/2008 | Cerra et al. | |
| 2009/0100068 A1* | 4/2009 | Gauba et al. | 707/10 |
| 2009/0164394 A1 | 6/2009 | Multerer et al. | |
| 2009/0274384 A1* | 11/2009 | Jakobovits | G06F 19/321 382/254 |
| 2009/0287989 A1 | 11/2009 | Chakra et al. | |
| 2010/0161620 A1 | 6/2010 | Lamere et al. | |
| 2010/0174993 A1 | 7/2010 | Pennington et al. | |
| 2010/0179874 A1 | 7/2010 | Higgins et al. | |
| 2010/0205541 A1* | 8/2010 | Rapaport et al. | 715/753 |
| 2010/0223610 A1 | 9/2010 | Dehaan et al. | |
| 2010/0226582 A1 | 9/2010 | Luo et al. | |
| 2010/0274820 A1* | 10/2010 | O'Brien et al. | 707/805 |
| 2011/0044512 A1* | 2/2011 | Bambha et al. | 382/118 |
| 2011/0153351 A1 | 6/2011 | Vesper et al. | |
| 2011/0161952 A1 | 6/2011 | Poddar et al. | |
| 2011/0252071 A1 | 10/2011 | Cidon | |
| 2011/0295775 A1 | 12/2011 | Wang et al. | |
| 2011/0314466 A1 | 12/2011 | Berg et al. | |
| 2012/0054731 A1 | 3/2012 | Aravamudan et al. | |
| 2012/0072420 A1 | 3/2012 | Moganti et al. | |
| 2012/0081395 A1 | 4/2012 | Adi et al. | |
| 2012/0102033 A1 | 4/2012 | Sarshar et al. | |
| 2012/0209896 A1* | 8/2012 | Raymond | 707/827 |
| 2012/0303629 A1* | 11/2012 | Klein | G06F 17/30997 707/741 |
| 2013/0086060 A1* | 4/2013 | Donley et al. | 707/736 |
| 2013/0239063 A1* | 9/2013 | Ubillos et al. | 715/838 |
| 2013/0297553 A1* | 11/2013 | Bierner | G06N 99/005 706/52 |
| 2013/0311472 A1* | 11/2013 | Cohen-Solal et al. | 707/737 |
| 2014/0006406 A1* | 1/2014 | Kafati et al. | 707/738 |

OTHER PUBLICATIONS

Knight, H., Putting the 'art' in artificial intelligence, http://web.mit.edu/newsoffice/2011/profile-torralba-1212.html?tmpl=component&print=1, Dec. 12, 2011.

* cited by examiner

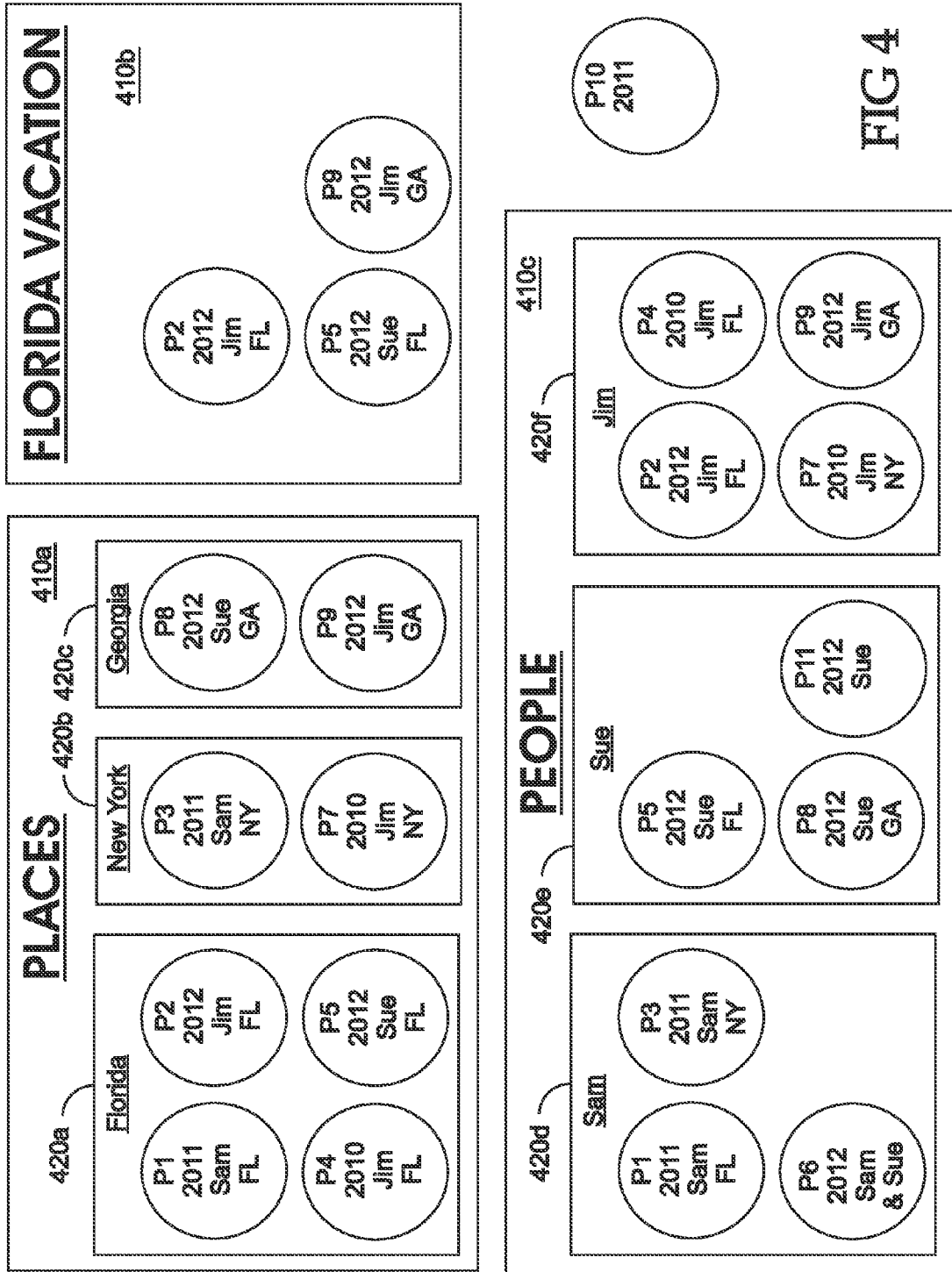

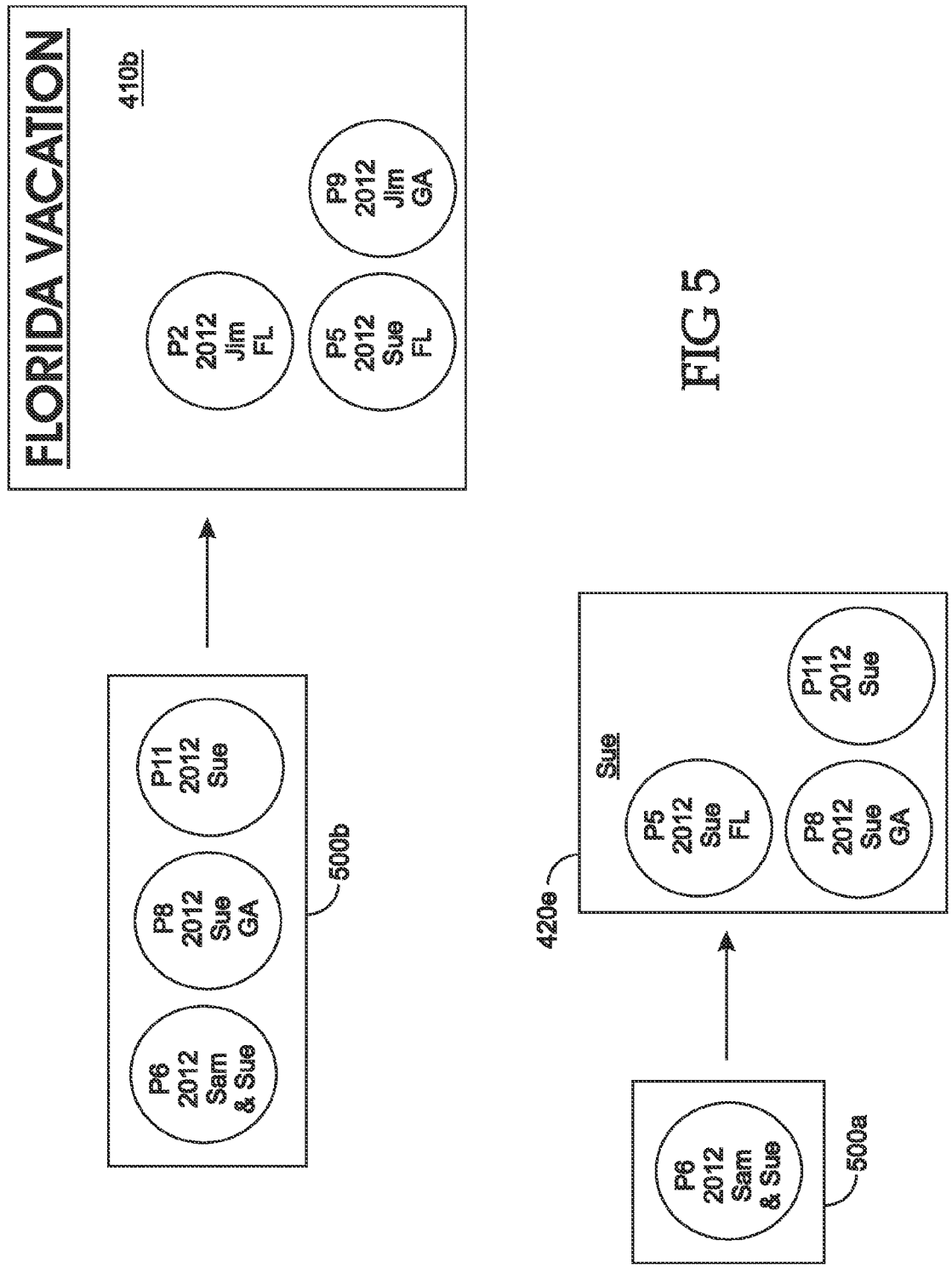

MIGRATION OF TAGS ACROSS ENTITIES IN MANAGEMENT OF PERSONAL ELECTRONICALLY ENCODED ITEMS

CROSS-REFERENCE TO RELATED APPLICATIONS

This application is related to U.S. patent applications: application Ser. No. 13/600,633, now abandoned; and application Ser. No. 13/600,659, now abandoned, each filed on even date herewith, which are incorporated herein in their entireties.

FIELD OF THE INVENTION

The present invention relates generally to managing and arranging personal items on an electronic device, and more particularly, to the migration of tags in the management and arrangement of such electronically encoded items.

BACKGROUND

In a known approach similar to that of a filing system, search techniques using keywords, including internet keyword searches, are often employed to group related electronically encoded items such as textual documents, photographs, and web pages.

In the filing system approach, distinct folders are first created for those categories of interest. Then the various electronically encoded items are manually partitioned into the folders. In an alternative to the filing system, the electronically encoded items are left as a single group but with appropriate textual keywords attached to individual electronically encoded items. To collect a related group of electronically encoded items, a search utilizing a keyword of interest is then performed. In some cases, it is necessary to manually create and associate keywords to the electronically encoded items.

In contrast to the keyword search an internet keyword search involves two distinct stages. First a keyword search is made for the occurrence of specified keywords in the objects of the search, i.e., the web pages on the internet. In the second stage of the internet search, web pages associated with the specified keywords are ranked according to predetermine criteria. The frequency with which other web pages hyper-link to the page under consideration is often used as a criterion for ranking a web page. In using this criterion, it is assumed that an "important" web page will usually have numerous other pages "pointing" to it. This criterion has proven to be very informative. An internet search using it is often successful in parsing out the few web pages that are really relevant even when keyword queries are sparse or non-specific.

BRIEF DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 4 is a block diagram of a result of placement by the user of the personal electronically encoded items of FIG. 3B.

FIG. 5 is a block diagram of two proposals created by the system for the perspectives and albums of FIG. 4.

DETAILED DESCRIPTION

Figure 1:
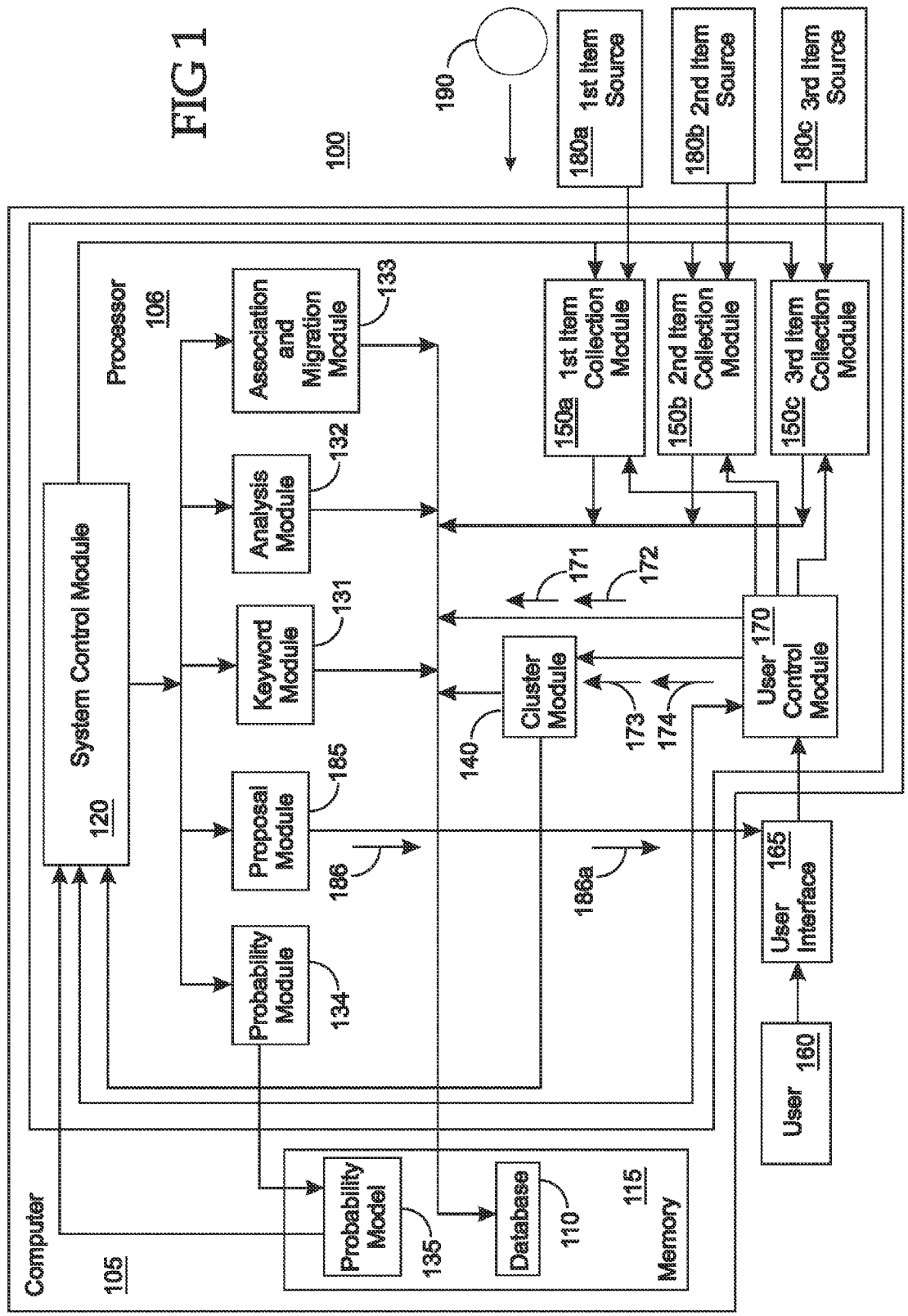
FIG. 1 is a block diagram of a system for clustering personal electronically encoded items as described in various representative embodiments.

As shown in the drawings for purposes of illustration and as described below, novel techniques are disclosed for clustering personalized digital items. In accordance with aspects of the disclosure, an exemplary system includes an adaptive, virtual assistant for managing personal information. The system utilizes an electronic device such as, including but not limited to, a smart-phone, tablet, wireless organizer, personal digital assistant, digital camera, and notebook/desktop computer or the like. An electronic device may be configured to generate a detailed log of the user's actions when manipulating and viewing his/her personal items, and uses such information as "training examples" from which a virtual assistant learns the user's preferences. The virtual assistant then uses this training to further manipulate the personal items and to present the results to the user for his/her acceptance or rejection. Over time, the virtual assistant can take over most of the work of organizing and tagging the personal items for the user in the background, so he/she can quickly retrieve relevant items. The system is so configured as to be capable of organizing and searching personal textual and non-textual electronic items such as photographs, videos, and sound recordings.

The virtual assistant can act somewhat like a human personal assistant who continually observes our interactions with our photos, learns our views, preferences and concepts intimately, and over time performs most of the work of organizing and tagging our photos for us quietly in the background, so we can pull up relevant results quickly whenever we want. For example, if the virtual assistant is requested to retrieve the user's Florida vacation photos, the virtual assistant knows exactly what is being requested. The photos that were taken in Florida on the user's recent family vacation will be retrieved, but excluded will be those taken on a separate business trip. Also retrieved will be photos taken during the two day drive down to Florida and back. Photos taken on the user's smart phone, as well as those taken by various other family members with a digital single lens reflex (SLR) camera can also be included. In addition, given that there may be hundreds of such photos, the virtual assistant will quietly remove photos that seem close duplicates or repetitious or "unimportant" such as photos taken with the lens cap on or out of focus presenting a selection of those photos that will likely be of most interest to the user.

The virtual assistant, therefore, can make a number of small but important determinations on the corpus of the user's photos to select a relevant subset in response to the user's request. If the virtual assistant makes a mistake, the user can make a correction which "teaches" the virtual assistant not to repeat that mistake in the future. The user can also request the virtual assistant to also manage all of the user's personal items such as like documents, videos, emails, and music in a similar manner.

The clustering system described herein includes a database stored in memory and configured to enable the following: (1) Creation of new entities, (2) Recall any keyword of any entity, (3) Query of all entities for items having selected attributes, not having those attributes, or having attributes with specified values, (4) registration of "listener" applications that monitor database operations for modification of specific attributes of database entities the detection of which result in the invocation of a supplied "call back" URL with the IDs of certain entities, whenever that attribute is modified of said entities. The clustering system is configured to provide for: (1) the automatic tagging of personal digital items, (2) guided clustering by the user which provides instructions to the virtual assistant as to user preferences, (3) the discovery of new concepts and relationships by the virtual assistant, and (4) the migration of tags across entities based on child-parent relationships. An objective of the representative embodiments disclosed herein is to make the task of human supervision as easy and enjoyable as possible and to progressively reduce the need for human supervision active learning embedded in the system.

FIG. 1 is a block diagram of a system 100 for clustering personal electronically encoded items 190 as described in various representative embodiments. For ease and clarity of illustration only one personal electronically encoded item 190 is shown in FIG. 1. In the representative embodiment of FIG. 1, the system 100 comprises a computer 105 and a user interface 165 by which a user 160 interacts with the computer 105. The computer 105 comprises a processor 106 and a memory 115. In various representative embodiments the physical unit on which the memory 115 is located or other physical units can function as a non-transitory computer-readable medium 115 having computer-executable instructions for causing the computer 105 comprising the processor 106 and associated memory 115 to carry out a method for managing electronically encoded items 190. The memory 115 comprises a database 110 and a probability model 135. The processor 106 comprises a system control module 120, a keyword module 131 also referred to herein as a tagging module 131, an analysis module 132, an association and migration module 133, a probability module 134, a proposal module 185, a user control module 170, a cluster module 140, and various item collection modules 150 which are also referred to herein as collection modules 150. In the representative embodiment of FIG. 1, the various item collection modules 150 include a first item collection module 150a, a second item collection module 150b, and a third item collection module 150c.

The system control module 120 is coupled to the user control module 170, the keyword module 131, the analysis module 132, the association and migration module 133, the probability module 134, the proposal module 185, and the various collection modules 150. The database 110 is coupled to the keyword module 131, the analysis module 132, the association and migration module 133, the user control module 170, the cluster module 140, and the various item collection modules 150. The user control module 170 is coupled to the cluster module 140 and to the various item collection modules 150. The item collection modules 150 are each further coupled to various item sources 180 also referred to herein as sources 180. For ease and clarity of illustration only three item collection modules 150 (first item collection module 150a, second item collection module 150b, and third item collection module 150c) with each item collection module 150 separately coupled to one of three item sources 180 (first item source 180a, second item source 180b, and third item source 180c) are shown in FIG. 1.

The item sources 180 are sources or repositories of various personal electronically encoded items 190 such, for example, as digital photographs 190, video files 190, music files 190, email files 190, and other written documents 190. The various item sources 180 could include, for example, a cellular phone 180, smart cellular phone 180, laptop computer 180, tablet 180, personal computer 180, digital camera 180, video camera 180, and any of various sources of music 180. The item sources 180 could be coupled to the system 100 by a wireless connection, a wired connection, or by any other appropriate method.

In operation, the system control module 120 and/or the user 160 via the user interface 165 and the user control module 170 instructs the item collection modules 150 to obtain personal electronically encoded items 190 from one or more of the item sources 180. In alternative configurations, the item sources 180 and/or the item collection modules 150 can initiate the uploading of the personal electronically encoded items 190 to the system 100. The item collection modules 150 store the personal electronically encoded items 190 in the database 110.

Once the personal electronically encoded items 190 are retrieved, the keyword module 131 creates and attaches as many keywords as possible automatically to the retrieved personal electronically encoded items 190. For example, when a user 160 takes a photograph 190 (a personal electronically encoded item 190) and uploads it into the database 110 of the system 100, the system 100 can generates several automatic keywords for the resulting photo item such as, for example, by using obvious cues like time which could be from a clock, place, altitude, and motion which could be from the global positioning system (GPS) obtained coordinates, as well as from other more subtle data obtained from sensors which perhaps measure light, humidity, and acceleration, certain camera settings such as exposure and scene type, the number of faces in the photo if any, and the identities of those faces. The ability to recognize faces can be implemented by a specific usage mode of the keyword module 131, as will be described later. The automatic tagging of keywords reduces the manual tagging efforts necessary by the user. The keyword module 131 can actuate this automatic tagging via autonomous agents designed for specific types of personal electronically encoded items 190. These autonomous agents register themselves with the database and are continuously active in terms of tagging new or modified entities. These autonomous agents as well as the system 100 can be based in the cloud, on a server, on a personal computer, or on any other appropriate device.

The user 160 via the user interface 165 and the user control module 170 can direct via perspective directives 171 the creation of various perspectives and via album directives 172 the creation of various albums each associated with a selected perspective wherein each perspective and album created is representative of a personal area of user 160 interest which the user 160 identifies. The user 160 can then direct the cluster module 140 to cluster various personal electronically encoded items 190 of the user 160 with the created perspectives. The probability module 134 develops and modifies the probability model 135 based on the user's 160 various actions which are shown, for example as the perspective directive 171, the album directive 172, the first clustering directive 173, and the second clustering directive 174.

The analysis module 132 analyzes the personal electronically encoded items 190 that have been associated with the previously created perspectives. Based on similarities determined from this analysis, the proposal module 185 can make proposal to the user 160 which are shown in FIG. 1 as proposal 186 and additional proposal 186a. In particular, the proposal module 185 can propose associating a previously unassociated personal electronically encoded item 190 with one of the created perspectives or albums wherein the proposal 186 is based on the probability model 135. Also, the proposal module 185 can propose the creation of a new perspective, a new album, or a new perspective and a new album associated with that new perspective and the association therewith of one or more of the one or more analyzed personal electronically encoded items 190.

The association and migration module 133 can respond to a user 160 decision to treat a previously created perspective or a previously created album as an individual entity and associate that entity with a newly created perspective or a newly created album and can then at the user's 160 direction migrate tags from the new perspective or the new album to the associated entity and to the associated personal electronically encoded items 190 of that entity.

Figure 2:
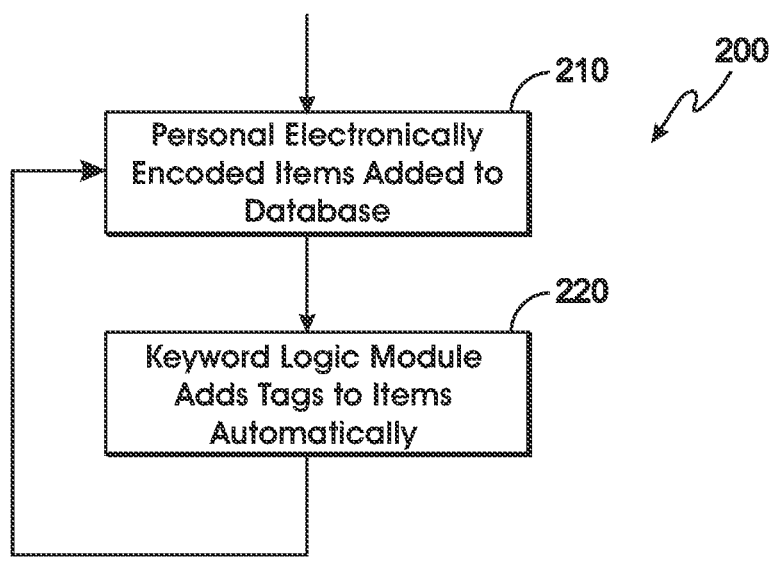
FIG. 2 is a flow chart of a method for automatic tagging as described in various representative embodiments.

FIG. 2 is a flow chart of a method 200 for automatic tagging as described in various representative embodiments. In block 210 of FIG. 2, one or more personal electronically encoded items 190 are added to the database 110. Block 210 then transfers control to block 220.

In block 220, the keyword module 131 with any agents operating on its behalf automatically adds tags to the one or more personal electronically encoded items 190. Block 220 then transfers control back to block 210 and waits for additional personal electronically encoded items 190 to be added to the database 110.

Figure 3A:
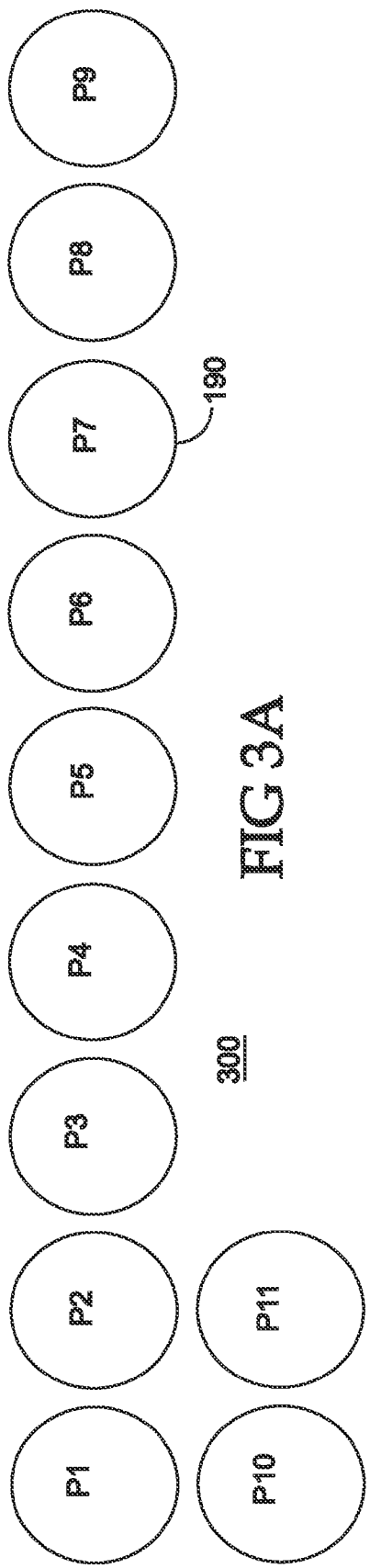
FIG. 3A is a drawing of a collection of personal electronically encoded items as described in various representative embodiments.

FIG. 3A is a drawing of a collection 300 of personal electronically encoded items 190 as described in various representative embodiments. For clarity and ease of illustration, only one of the personal electronically encoded items 190 therein has an identifying number associated with it. The personal electronically encoded items 190 in FIG. 3A are photographs P1, P2, P3, P4, P5, P6, P7, P8, P9, P10, P11 before uploading into the database 110.

Figure 3B:
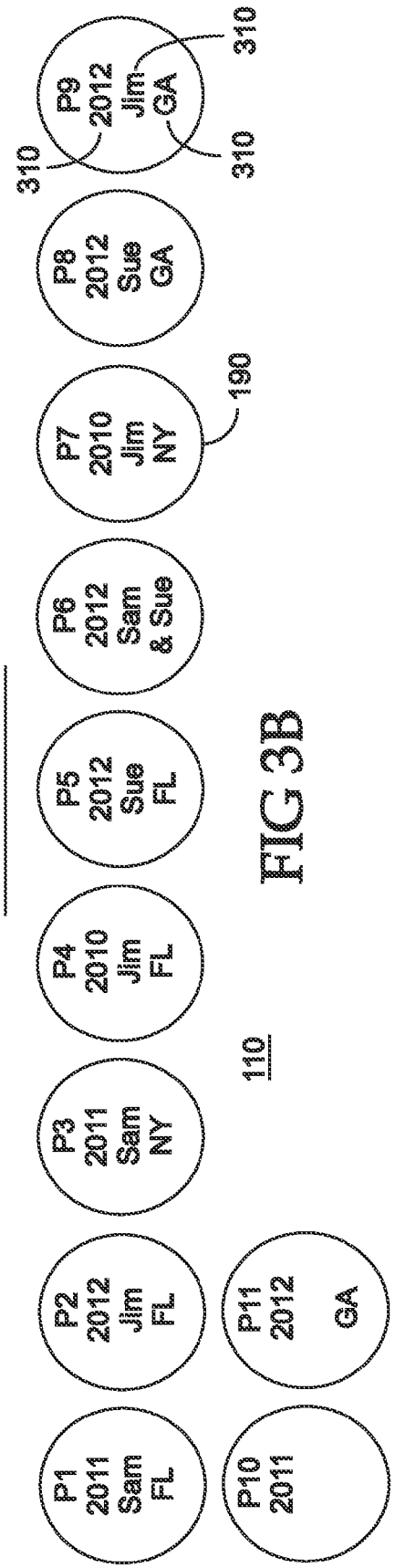
FIG. 3B is a drawing of the database containing the multiple personal electronically encoded items of FIG. 3A.

FIG. 3B is a drawing of the database 110 containing the multiple personal electronically encoded items 190 of FIG. 3A. Also for clarity and ease of illustration, only three tags 310 or keywords 310 associated with one of the personal electronically encoded items 190 therein have identifying numbers associated with them. In this example, the tags 310 shown are the date tag (2012) 310, the person tag (Jim) 310, and the place tag (GA, i.e., Georgia) 310. The personal electronically encoded items 190 in FIG. 3B are the photographs P1, . . . P11 after uploading into the database 110 and after automatic tagging by the keyword module 131.

Tags or labels 310 associated with photograph P1 are the year 2011 that it was taken, the name of the individual (Sam) in the photograph, and the fact that it was taken somewhere in Florida. Tags or labels 310 associated with photograph P2 are the year 2012 that it was taken, the name of the individual (Jim) in the photograph, and the fact that it was taken somewhere in Florida. Tags or labels 310 associated with photograph P3 are the year 2011 that it was taken, the name of the individual (Sam) in the photograph, and the fact that it was taken somewhere in New York. Tags or labels 310 associated with photograph P4 are the year 2010 that it was taken, the name of the individual (Jim) in the photograph, and the fact that it was taken somewhere in Florida. Tags or labels 310 associated with photograph P5 are the year 2012 that it was taken, the name of the individual (Sue) in the photograph, and the fact that it was taken somewhere in Florida. Tags or labels 310 associated with photograph P6 are the year 2012 that it was taken, and the name of the individuals (Sam and Sue) in the photograph. There was no information available to indicate where the photograph P6 was taken. Tags or labels 310 associated with photograph P7 are the year 2010 that it was taken, the name of the individual (Jim) in the photograph, and the fact that it was taken somewhere in New York. Tags or labels 310 associated with photograph P8 are the year 2012 that it was taken, the name of the individual (Sue) in the photograph, and the fact that it was taken somewhere in Georgia. Tags or labels 310 associated with photograph P9 are the year 2012 that it was taken, the name of the individual (Jim) in the photograph, and the fact that it was taken somewhere in Georgia. The only tag or label 310 associated with photograph P10 is the year 2011 in which it was taken. No other information was available for automatic tagging. The only tags or labels 310 associated with photograph P11 are the year 2012 in which it was taken and the name of the individual (Sue) in the photograph.

The above tags or labels 310 could have been obtained from the use of a face recognition module, from GPS data, and from meta data associated with each photograph 190, and from other appropriate sources. None of it had to necessarily be supplied directly by the user 160, and as such time and effort required from the user 160 is minimized.

FIG. 4 is a block diagram of a result of placement by the user 160 of the personal electronically encoded items 190 of FIG. 3B. In obtaining the result of FIG. 4, the user 160 gathers the various personal electronically encoded items 190, i.e., the photographs 190, into different perspectives 410 as he/she chooses. A perspective 410 is a view of the personal electronically encoded items 190 that the user 160 has chosen to collect together.

In FIG. 4, the user 160 has chosen to collect his/her personal electronically encoded items 190 (photographs P1 . . . P11) into three separate perspectives 410—the places perspective 410a, the Florida vacation perspective 410b, and the people perspective 410c. Within the places perspective 410a, the user 160 has chosen to create three albums 420—the Florida album 420a, the New York album 420b, and the Georgia album 420c. Within the people perspective 410c, the user 160 has chosen to create three separate albums 420—the Sam album 420d, the Sue album 420e, and the Jim album 420f.

Note that the Florida album 420a within the places perspective 410a includes photograph P1, photograph P2, photograph P4, and photograph P5; the New York album 420b within the places perspective 410a includes photograph P3 and photograph P7; and the Georgia album 420c within the places perspective 410a includes photograph P8 and photograph P9. The Florida vacation perspective 410b does not include an album 420 but does include photograph P2. photograph P5, and photograph P9. The Sam album 420d within the people perspective 410c includes photograph P1, photograph P3, and photograph P6; the Sue album 420e within the people perspective 410c includes photograph P5, photograph P8, and photograph P11; and the Jim album 420f within the people perspective 410c includes photograph P2, photograph P4, photograph P7, and photograph P9. Also, note that the user 160 has chosen not to include photograph P10 in any of the perspectives 410 or albums 420 since it does not fit into his/her criteria for the created perspectives 410 and albums 420. In addition, note that the user 160 chose to include photograph P9 in the Florida vacation perspective 410b even though photograph P9 was taken in Georgia not Florida. In this representative example, the user 160 recalled that photograph P9 was taken of Jim while traveling to Florida for the vacation in 2012. Thus, the user 160 included that photograph in the Florida vacation perspective 410b even though it was a part of traveling to the vacation and might or might not be considered to be a part of the vacation itself.

Assigning the various personal electronically encoded items 190 to perspectives 410 and albums 420 is similar to the partitioning of a file system into folders. However, an important difference is that each of the items in a collection of items or the collection itself, such as the photographs P1, . . . P11, need not be assigned to a single unique perspective 410. There can be many perspectives 410 or user views 410 for the photos, in fact as many as the user 160 decides to have. Each perspective 410 is a different way of looking at the same collection of photographs, for example, family vs. school photos or vacation vs. other photos. Such a sorting of items into groups is very intuitive and is one of the first things a child learns.

In order to learn from the user's act of placing these personal electronically encoded items 190 into the various perspectives 410 and albums 420, the system control module 120 observes the actions which the user 160 has performed. From such information the system control module 120 will be able to create more elaborate personalized keywords 310 for the personal electronically encoded items 190. In other words, the system control module 120 observes the user's 160 interactions with groups of personal electronically encoded items 190 such as photographs to find cues from which to automatically derive those keywords 310. This is referred to herein as "guided clustering".

Once the user 160 has created one or more perspectives 410 and optional one or more albums 420, the system control module 120 uses the user's 160 preferences to create proposed additions to the perspectives 410 and albums 420. Thus, it is not necessary for the user 160 to drag or otherwise manually partition all photographs that might be considered a part of a given perspective 410 or album 420 to that perspective 410 or album 420. The user 160 can manually drag or identify some photographs to some perspectives/albums as exemplars leaving several unclassified. The user 160 can then rely on the rest of the photographs being directed towards the most appropriate perspective/album. The system control module 120 does this by creating the proposed additions to the perspectives 410 and albums 420 based on the user's 160 previous choices. This predictive ability can be based on a probability model 135 that is associated with each perspective 410. As the user 160 classifies some exemplars, he/she "trains" or adjusts the probability model 135. This adjustment is made based on "signatures" generated from the attributes of the exemplar photos, like their keywords 310, as well as their "content" such as pixel values (JPEG files). The probability model 135 then can produce a soft "belief", i.e., a proposal, for each remaining unclassified photograph. These proposals can be communicated to the user 160 via some suitable visual way that encodes a large amount of information regarding the possible classification of all the unlabelled photographs. This visual communication then allows the user to easily pull in more exemplars into various albums.

FIG. 5 is a block diagram of two proposals 500 created by the system 100 for the perspectives 410 and albums 420 of FIG. 4. In the first proposal 500a, the system control module 120 proposes that photograph P6 which was taken in 2012 of both Sam and Sue be included in the Sue album 420e base on the fact that Sue is in photograph P6. The user 160 now decides whether or not to include photograph P6 in the Sue album 420e. The user 160 could decide to include photograph P6 in the Sue album 420e simply because Sue is in that photograph. Or, the user 160 may decide not to include photograph P6 in the Sue album 420e because Sue he/she wanted to restrict the Sue album 420e to only pictures of Sue and no one else.

In the second proposal 500b, the system control module 120 proposes that photograph P6 which was taken in 2012 of both Sam and Sue, the photograph P8 which was taken in 2012 of Sue in Georgia, and the photograph P11 which was taken in 2012 of Sue be included in the Florida vacation perspective 410b. The system control module 120 proposed the inclusion of photograph P6 in the Florida vacation perspective 410b based on the date (2012) that the photograph was taken and that Sue was included. The user 160 rejects this proposal as he/she knows that Jim and Sue are members of the same family whereas Sam is not and the vacation to Florida was a family vacation not including Sam.

The system control module 120 proposed the inclusion of photograph P8 in the Florida vacation perspective 410b based on the date (2012) that the photograph was taken, that Sue was included, and that the photograph was taken in Georgia. The system control module 120 noted that the user 160 had included in the Florida vacation perspective photograph P9 which was taken also in 2012 in Georgia and that photograph P5 taken in 2012 of Sue was also included in the Florida vacation perspective photograph P9. The user 160 can once again accept or reject this proposal. In this case, the user 160 accepts the proposal as he/she knows that Sue was only in Georgia in 2012 at the same time that Jim was on the way to the vacation to Florida.

The system control module 120 proposes the inclusion of photograph P11 in the Florida vacation perspective 410b based on the date (2012) that the photograph was taken and that Sue was included. The system control module 120 noted that the user 160 had included in the Florida vacation perspective photograph P5 which was taken also in 2012 of Sue. And, the user 160 can again accept or reject this proposal. In this case, the user 160 recognizes that the photograph P11 was taken near the top of a mountain in New Hampshire not in Florida and chooses to reject the proposal for inclusion in the Florida vacation perspective 410b.

In addition to monitoring the user's 160 decisions in associating personal electronically encoded items 190 with the various perspectives 410 and albums 420, the system control module 120 also monitors the decisions made by the user 160 to the proposals 500 that were made. A proposal 500 rejected by the user 160 can be important in modifying the criteria used by the system control module 120 in making proposals, and a proposal 500 accepted by the user 160 can be important by reinforcing the criteria used. As more and more decisions are made regarding the system control module 120 and proposals 500, more and more of the proposals 500 will more likely be accepted by the user 160 and the user's 160 active supervision of a given perspective 410 should decrease.

The perspectives 410 including any modifications made in response to the system 100 proposals 500 along with any associated probability model 135 is stored in the database 110. As such the user 160 can stop his/her interaction with a perspective 410 and reload it at a later time. If the system 100 operates in the cloud, the user 160 can also reload the perspective 410 from a different device. At some point the user 160 can give more control to the system 100 regarding specified perspectives 410 such that new photographs added by the user 160 if appropriate will automatically appear in this particular perspective 410 placed in the correct album 420. At the same time, these new photographs will also appear in all other perspectives 410, placed appropriately according to their respective trained, probability models 135.

Figure 6:
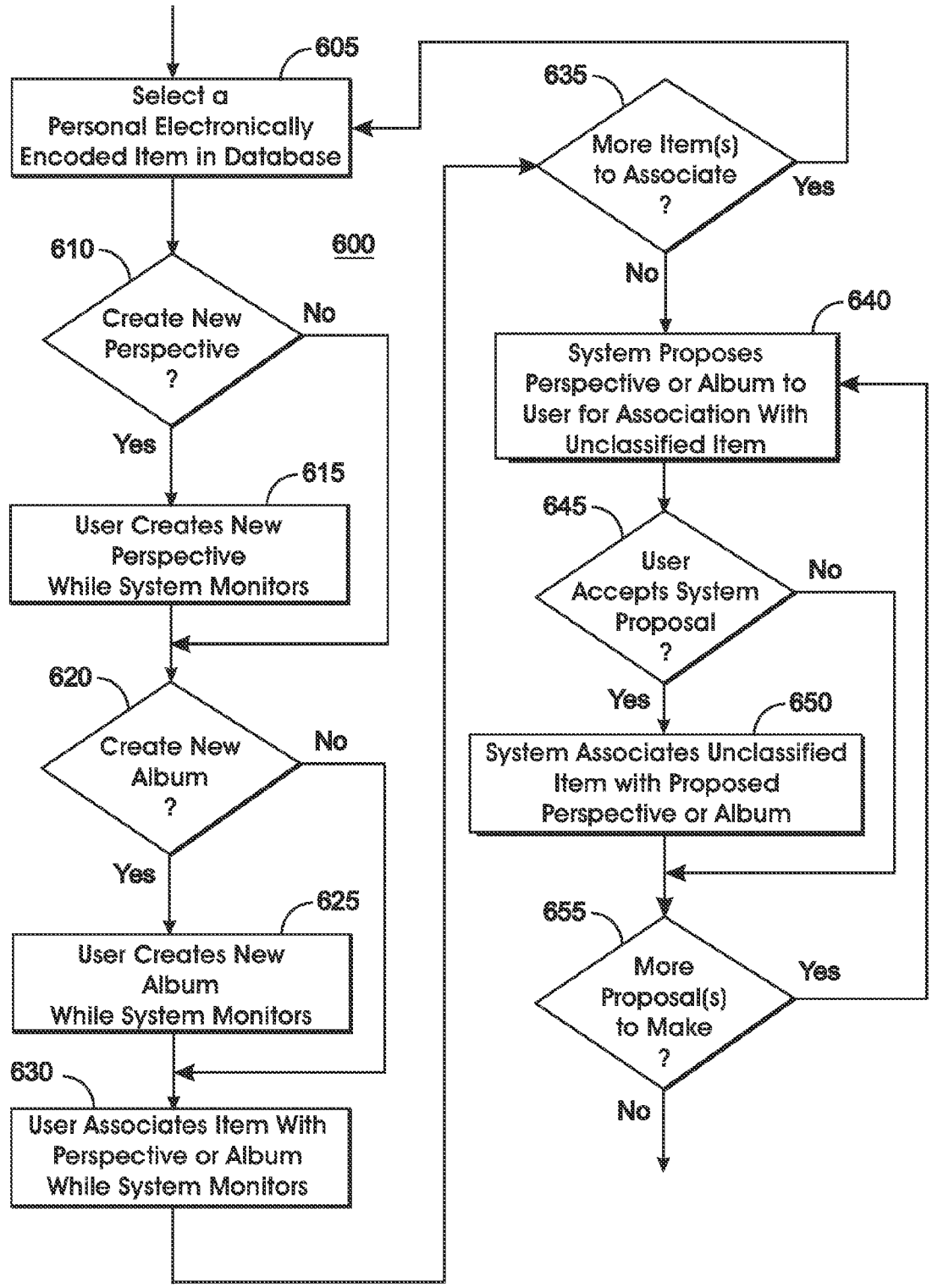
FIG. 6 is a flow chart of a method for guided clustering of personal electronically encoded items as described in various representative embodiments.

FIG. 6 is a flow chart of a method 600 for guided clustering of personal electronically encoded items 190 as described in various representative embodiments. In block 605 of FIG. 6, the user 160 selects a personal electronically encoded item 190 from the database 110. Block 605 then transfers control to block 610.

In block 610, if the user 160 wishes to create a new perspective 410 with which to associate the personal electronically encoded item 190, block 610 transfers control to block 615. Otherwise block 610 transfers control to block 620.

In block 615, the user 160 creates the new perspective 410 while the system 100 monitors the user's 160 action. Block 615 then transfers control to block 620.

In block 620, if the user 160 wishes to create a new album 420 with which to associate the personal electronically encoded item 190, block 620 transfers control to block 625. Otherwise block 620 transfers control to block 630.

In block 625, the user 160 creates the new album 420 while the system 100 monitors the user's 160 action. Block 625 then transfers control to block 630.

In block 630, the user 160 associates the personal electronically encoded item 190 with a perspective 410 or an album 420 while the system 100 monitors the user's 160 action. Block 630 then transfers control to block 635.

In block 635, if there are more personal electronically encoded item 190 to associate with a perspective 410 or an album 420, block 635 transfers control back to block 605. Otherwise block 635 transfers control to block 640.

In block 640, based on the user's 160 prior actions which the system 100 has been monitoring, the system 100 proposes a perspective 410 or album 420 to the user 160 with which to associate an unclassified personal electronically encoded item 190. Block 640 then transfers control to block 645.

In block 645, if the user 160 accepts the system's 100 proposal, block 645 transfers control to block 650. Otherwise block 645 transfers control to block 655.

In block 650, the system 100 associates the unclassified personal electronically encoded item 190 with the proposed perspective 410 or album 420 while the system 100 monitors the user's 160 decision. Block 650 then transfers control to block 655.

In block 655, if there are more proposals for the system 100 to make, block 655 transfers control back to block 640. Otherwise block 655 terminates the process.

Figure 7:
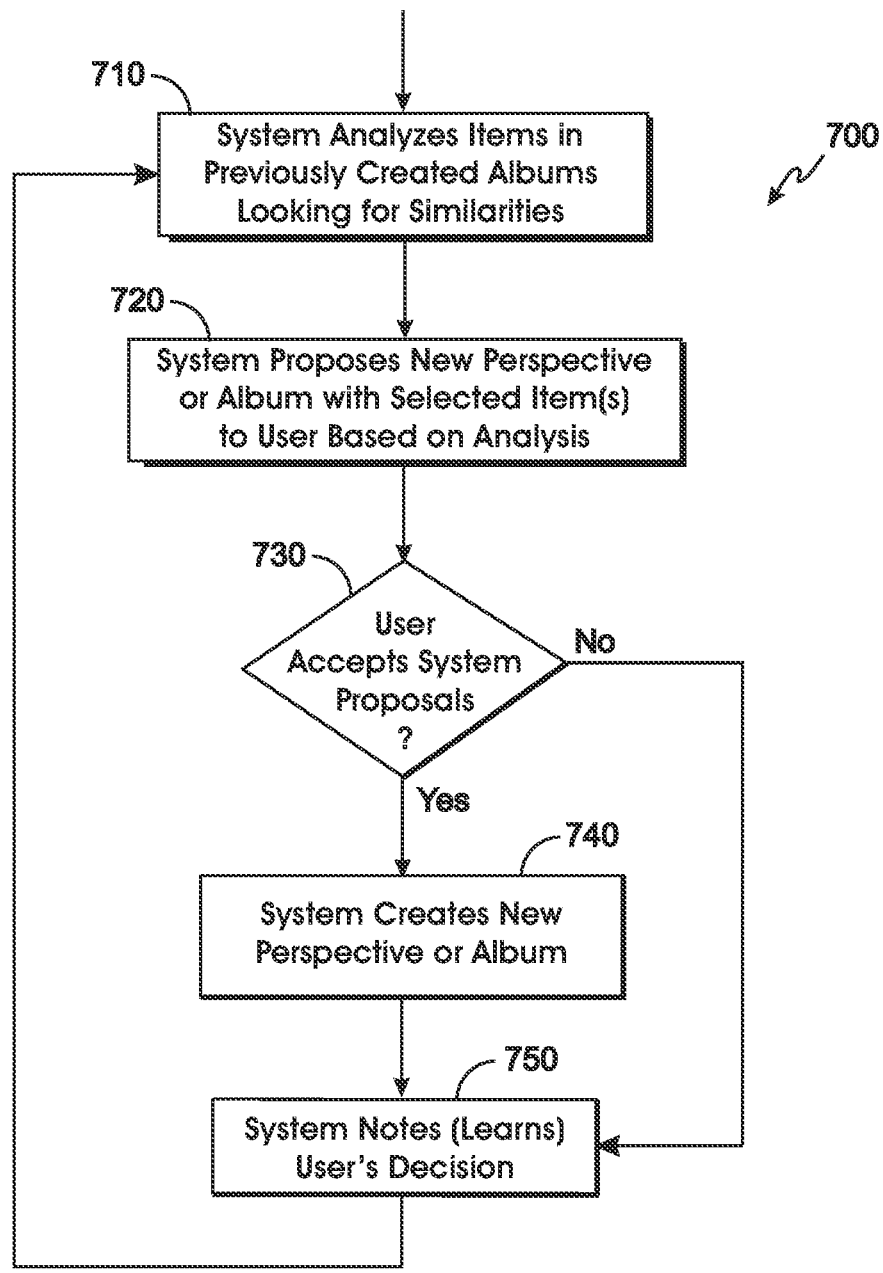
FIG. 7 is a flow chart of a method for the discovery of new concepts and relationships by the system as described in various representative embodiments.

FIG. 7 is a flow chart of a method 700 for the discovery of new concepts and relationships by the system 100 as described in various representative embodiments. In block 710 of FIG. 7, the system 100 analyzes previously placed personal electronically encoded items 190 and previously created perspectives 410 and albums 420 to discover similarities from which it can propose a new perspective 410 or a new album 420. This proposal is based not only on these similarities but also on the system's 100 observations of the user's 160 previous actions and decisions such as with previous placements and can be based on a probability model 135 that the user 160 or system 100 chooses to employ. This probability model 135 could be based on the user's actions as observed by the system 100. Block 710 then transfers control to block 720.

In block 720, the system 100 proposes a new perspective 410 or new album 420 with selected personal electronically encoded items 190 to the user 160. Block 720 then transfers control to block 730.

In block 730, if the user 160 accepts the system's 100 proposal, block 730 transfers control to block 740. Otherwise block 730 transfers control to block 750.

In block 740, the system 100 creates the proposed new perspective 410 or album 420 with selected personal electronically encoded items 190. Block 740 then transfers control to block 750.

In block 750, the system 100 monitors and learns from the user's 160 decision to accept or reject the system's 100 proposal. Block 750 then transfers control back to block 710.

Figure 8:
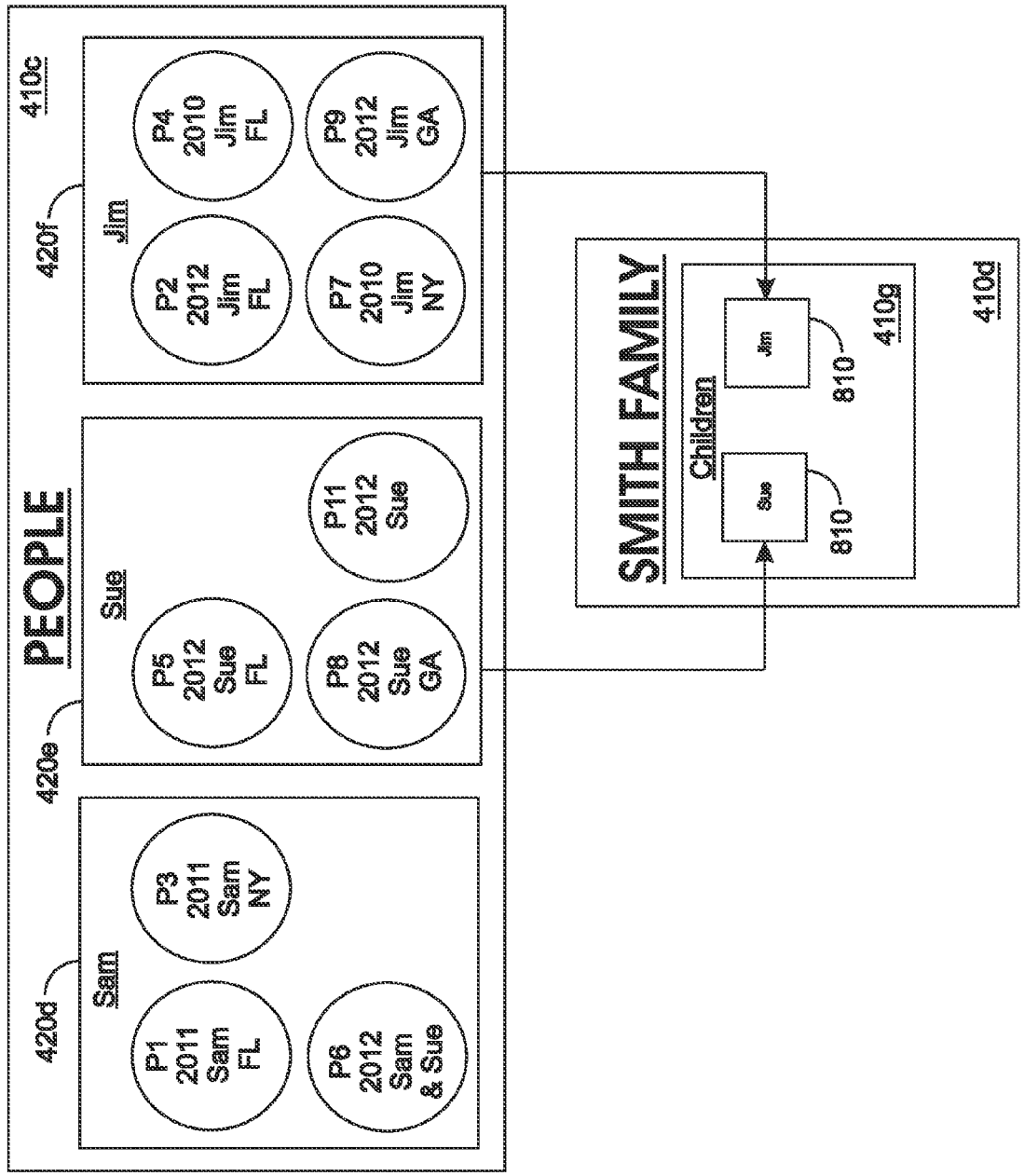
FIG. 8 is a block diagram of a result of treating albums of FIG. 4 as individual entities.

FIG. 8 is a block diagram of a result of treating albums 420 of FIG. 4 as individual entities 810. In FIG. 8, the Sue album 420e and the Jim album 420f of FIG. 4 are each treated as a personal electronically encoded item 190 and are separately added as entities 810 to the newly created children album 420g of the newly created Smith family perspective 410d. The albums 420 can also be treated as perspectives 410.

If the user 160 creates a new perspective 410 and albums 420, the system 100 will monitor this creation and note the fact that the user 160 has one or more new concepts in mind which correspond to the new perspective 410 and to the new albums 420 of that perspective 410. The system 100 records the fact that the items 190 in an album 420 are "members" of that album 420, that is, that they have a "belong to" relationship with the concept represented by the album 420. If, for example, in the representative example of FIG. 4 the Sam album 420d, the Sue album 420e, and the Jim album 420f in the people perspective 410c were restricted to single person photographs only, photograph P6 would be removed from the Sam album 420d, and the system 100 will record the fact that the remaining photographs in those albums 420 "belong to" a single person. In other perspectives 410 some of the person albums 420 could be also directly associated with other perspectives 410 such as an occupation group such as physicians or engineers or a family as in FIG. 8. Consequently, as indicated in FIG. 8, the Sue album 420e and the Jim album 420f belong to or are associated with the people perspective 410c and also to or with the Smith family perspective 410d.

Figure 9:
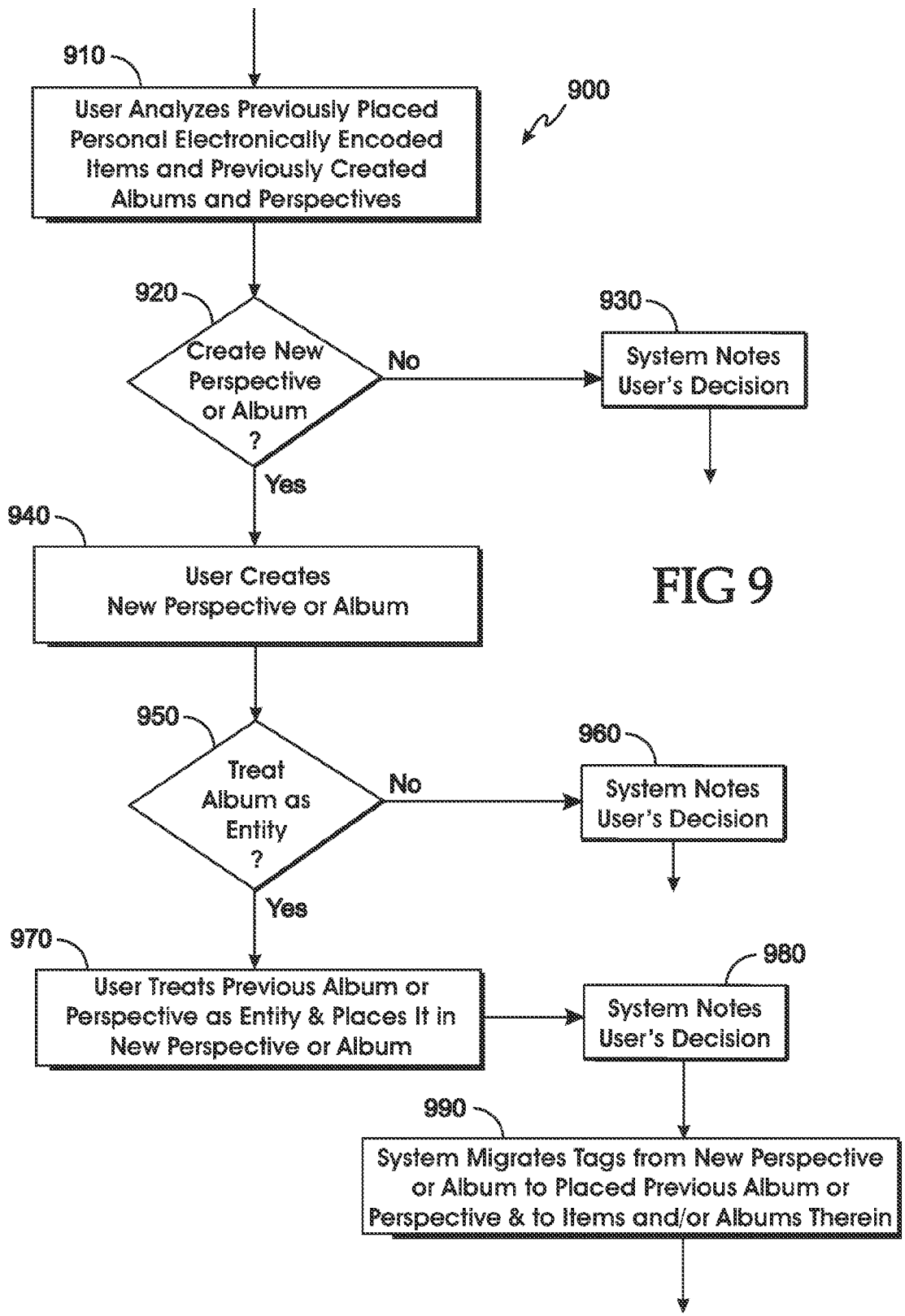
FIG. 9 is a flow chart of a method for the migration of tags as described in various representative embodiments.

FIG. 9 is a flow chart of a method 900 for the migration of tags 310 as described in various representative embodiments. In block 910 of FIG. 9, the user 160 analyzes previously placed personal electronically encoded items 190 and previously created perspectives 410 and albums 420 to discover similarities from which he/she can create a new perspective 410 or a new album 420. Block 910 then transfers control to block 920.

In block 920, if the user 160 decides to create a new perspective 410 or a new album 420, block 920 transfers control to block 940. Otherwise block 920 transfers control to block 930.

In block 930, the system 100 notes the user's 160 decision. As a part of this monitoring process, the system 100 discovers new preferences of the user 160. Block 930 then terminates the process.

In block 940, the user 160 creates a new perspective 410 or a new album 420 based on his/her analysis. Block 940 then transfers control to block 950.

In block 950, if the user 160 decides to treat a previously created album 420 as an entity, block 950 transfers control to block 970. Otherwise block 950 transfers control to block 960.

In block 960, the system 100 notes the user's 160 decision. As a part of this monitoring process, the system 100 discovers new preferences of the user 160. Block 960 then terminates the process.

In block 970, the user 160 treats a previously created album 420 or perspective 410 as an entity 810 and places it in the newly created perspective 410 or album 420. Block 970 then transfers control to block 980.

In block 980, the system 100 notes the user's 160 decision. As a part of this monitoring process, the system 100 discovers new preferences of the user 160. Block 980 then transfers control to block 990.

In block 990, the system 100 migrates tags 310 from the new perspective 410 or new album 420 to the placed previous album 420 or perspective 410 and to the electronically encoded items 190 and/or albums 420 therein. Block 990 then terminates the process.

The system 100 also has the capability of migrating keywords 310 across related entities 810. Each entity 810, including each album 420, can be assigned keywords 310. Any name which the user 160 assigns to an album 420 is itself just a special case of a keyword 310. Generally, the keywords 310 of each entity are automatically migrated, i.e., copied to, each of its members if it has any. Thus, in the representative embodiment of FIG. 4 the name of the Jim album 420*f* will migrate as a keyword 310 to each one of Jim's pictures. The photographs of Jim might not have contained his name as a keyword 310 since the user 160 may have just visually recognized Jim in the photographs and dragged them into the Jim album 420*f*. Also, since the Jim album 420*f* is also a member of the children album 420*g* in the Smith family perspective 410*d* (see FIG. 8), the name of the Smith family perspective 410*d* and the children's album 420*g* will also become keywords 310 of Jim's photographs. Thus, a photograph of an individual can acquire social circle keywords 310 such as a family name and other keywords 310 such as occupation keywords 310 even when the user 160 did not explicitly tag that photograph with these criteria.

Conversely, in certain situations, keyword tags 310 can also be automatically migrated from members of an entity 810 such as an album 420 to the entity 810 itself. This "upward" migration should, however, be done sparingly and only after satisfaction of relatively strict criteria, in order to prevent excessive application of keywords 310. As an example, if most of the photographs 190 in an album 420 were taken on Halloween and were auto tagged as such, e.g. from calendar information about public holidays, then the album 420 itself can be allowed to absorb the keyword 310 "Halloween". Subsequently if a photograph 190 is added to the album 420 that does not have this explicit tag 310, it will nevertheless acquire the "Halloween" tag 310 by virtue of being a member of its parent album 420. The upward and sideways migration of tags 310 further helps to populate the personal electronic encoded items 190 with useful keywords 310, thereby reducing the need for user 160 supervision.

Once extensive keyword 310 tagging has been performed by the above mechanisms, a keyword 310 search on the user's 160 personal electronically encoded items 190 becomes more powerful and meaningful. As an example, if a user 160 wants to recall photographs of a particular concept, he/she can begin by opening a perspective 410 and then performing a rough keyword 310 search for what is wanted. The items 190 returned in response to the search may be numerous with many of then not what was wanted since the query may not have been precise enough. However, it is likely that few will be returned that are what was wanted. These few exemplars can be pulled into an album. After that is accomplished, the system 100 "rearranges" and "re-clusters" the remaining items 190 according to their match to the exemplars. This will immediately improve the quality of the perspective that was created by the query and permit the user 160 to find more exemplars more easily. Finally after a few such iterations, the user 160 will have clustered all the photographs that are needed. In an analogous manner, the user 160 can also develop perspectives 410 to classify personal electronically encoded items 190 across two or more concepts.

In another representative example, the user 160 may wish to create a work book. The user 160 begins by writing a "journal" about some concept such as, for example, a vacation or a conference. The system can then propose photographs that "match" the text of the journal. If the user accepts some of the proposed photographs, they will be treated as exemplars, and the system 100 should then make even better proposals to the user 160, thereby increasing the productivity of the user 160. The proposals made by the system 100 can remind the user 160 in unexpected ways which may add to the quality of the journal.

Embodiment 1 is directed to a method 900 for managing electronically encoded items 190 on an electronic device. The method 900 comprises analyzing one or more personal electronically encoded items 190 associated with a previously created perspective 410 or with a previously created album 420 associated with the previously created perspective 410, where the previously created perspective 410 or the previously created perspective 410 and the previously created album 420 represent personal areas of user 160 interest identified by the user 160, responsive to a user 160 decision to create a new perspective 410, a new album 420 associated with one of the previously created perspectives 410, or a new perspective 410 and a new album 420 associated with the new perspective 410, creating respectively the new perspective 410, the new album 420 associated with one of the previously created perspectives 410, or the new perspective 410 and the new album 420 associated with the new perspective 410, where the new perspective 410, the new album 420 associated with one of the previously created perspectives 410, or the new perspective 410 and the new album 420 associated with the new perspective 410 represent personal areas of user 160 interest identified by the user 160, and responsive to a user 160 decision to treat the previously created perspective 410 or the previously created album 420 as an individual entity 810, associating the previously created perspective 410 or the previously created album 420 with the new perspective 410 or with the new album 420 and respectively migrating tags from the new perspective 410 or the new album 420 to the associated previously created perspective 410 or the previously created album 420 and to associated ones of the one or more personal electronically encoded items 190.

Embodiment 2 is directed to embodiment 1, further comprising modifying a probability model 135 for managing the user's 160 one or more personal electronically encoded items 190 based on the decision to create the new perspective 410 or the new album 420 and on the decision to treat the previously created perspective 410 or the previously created album 420 as individual entities 810.

Embodiment 3 is directed to embodiment 2, wherein modification of the probability model 135 is performed automatically.

Embodiment 4 is directed to embodiment 1, wherein the one or more personal electronically encoded items 190 are stored in a database 110.

Embodiment 5 is directed to embodiment 1, further comprising collecting the one or more personal electronically encoded items 190 from one or more sources 180 comprising one or more of a cloud 180, a cellular phone 180, a mobile electronic device 180, a personal computer 180, the internet 180, a network 180, a tablet 180, a digital camera 180, a camera 180, a digital video camera 180, a video camera 180, a digital sound recorder 180, a sound recorder 180, and a tape recorder 180.

Embodiment 6 is directed to embodiment 1, wherein the one or more personal electronically encoded items 190 comprise one or more digital photographs 190, analog photographs 190, digital videos 190, analog videos 190, digitally encoded sound files 190, analog encoded sound files 190, written documents 190, and/or emails 190.

Embodiment 7 is directed to embodiment 1, further comprising automatically tagging one or more of the one or more personal electronically encoded items 190 with one or more keywords 310.

Embodiment 8 is directed to a non-transitory computer-readable medium 115 having computer-executable instructions for causing a computer 105 comprising a processor 106 and associated memory 115 to carry out a method 900 for managing electronically encoded items 190, the method 900 comprising analyzing one or more personal electronically encoded items 190 associated with a previously created perspective 410 or with a previously created album 420 associated with the previously created perspective 410, where the previously created perspective 410 or the previously created perspective 410 and the previously created album 420 represent personal areas of user 160 interest identified by the user 160, responsive to a user 160 decision to create a new perspective 410, a new album 420 associated with one of the previously created perspectives 410, or a new perspective 410 and a new album 420 associated with the new perspective 410, creating respectively the new perspective 410, the new album 420 associated with one of the previously created perspectives 410, or the new perspective 410 and the new album 420 associated with the new perspective 410, where the new perspective 410, the new album 420 associated with one of the previously created perspectives 410, or the new perspective 410 and the new album 420 associated with the new perspective 410 represent personal areas of user 160 interest identified by the user 160, and responsive to a user 160 decision to treat the previously created perspective 410 or the previously created album 420 as an individual entity 810, associating the previously created perspective 410 or the previously created album 420 with the new perspective 410 or with the new album 420 and respectively migrating tags from the new perspective 410 or the new album 420 to the associated previously created perspective 410 or the previously created album 420 and to associated ones of the one or more personal electronically encoded items 190.

Embodiment 9 is directed to embodiment 8, the method 900 further comprising modifying a probability model 135 for managing the user's 160 one or more personal electronically encoded items 190 based on the decision to create the new perspective 410 or the new album 420 and on the decision to treat the previously created perspective 410 or the previously created album 420 as individual entities 810.

Embodiment 10 is directed to embodiment 9, wherein modification of the probability model 135 is performed automatically.

Embodiment 11 is directed to embodiment 8, wherein the one or more personal electronically encoded items 190 are stored in a database 110.

Embodiment 12 is directed to embodiment 8, the method 900 further comprising collecting the one or more personal electronically encoded items 190 from one or more sources 180 comprising one or more of a cloud 180, a cellular phone 180, a mobile electronic device 180, a personal computer 180, the interne 180, a network 180, a tablet 180, a digital camera 180, a camera 180, a digital video camera 180, a video camera 180, a digital sound recorder 180, a sound recorder 180, and a tape recorder 180.

Embodiment 13 is directed to embodiment 8, wherein the one or more personal electronically encoded items 190 comprise one or more digital photographs, analog photographs, digital videos, analog videos, digitally encoded sound files, analog encoded sound files, written documents, and/or emails.

Embodiment 14 is directed to embodiment 8, the method 900 further comprising automatically tagging one or more of the one or more personal electronically encoded items 190 with one or more keywords 310.

Embodiment 15 is directed to a system 100 for managing electronically encoded items 190. The system 100 comprises a processor and memory including an analysis module 132 configured to analyze one or more personal electronically encoded items 190 associated with a previously created perspective 410 or with a previously created album 420 associated with the previously created perspective 410, where the previously created perspective 410 or the previously created perspective 410 and the previously created album 420 represent personal areas of user 160 interest identified by the user 160, a user control module 170 configured in response to a user 160 decision to create a new perspective 410 for creating a new album 420 associated with one of the previously created perspectives 410, or a new perspective 410 and a new album 420 associated with the new perspective 410, respectively the new perspective 410, the new album 420 associated with one of the previously created perspectives 410, or the new perspective 410 and the new album 420 associated with the new perspective 410, where the new perspective 410, the new album 420 associated with one of the previously created perspectives 410, or the new perspective 410 and the new album 420 associated with the new perspective 410 represent personal areas of user 160 interest identified by the user 160, and an association and migration module 133 configured in response to a user 160 decision to treat the previously created perspective 410 or the previously created album 420 as an individual entity 810 for associating the previously created perspective 410 or the previously created album 420 with the new perspective 410 or with the new album 420 and for migrating tags from the new perspective 410 or the new album 420 to the associated previously created perspective 410 or the previously created album 420 and to associated ones of the one or more personal electronically encoded items 190.

Embodiment 16 is directed to embodiment 15, further comprising a probability module 134 configured to modify a probability model 135 for managing the user's 160 one or more personal electronically encoded items 190 based on the decision to create the new perspective 410 or the new album 420 and on the decision to treat the previously created perspective 410 or the previously created album 420 as individual entities 810.

Embodiment 17 is directed to embodiment 16, wherein modification of the probability model 135 is performed automatically.

Embodiment 18 is directed to embodiment 15, wherein the one or more personal electronically encoded items 190 are stored in a database 110.

Embodiment 19 is directed to embodiment 15, further comprising a collection module 150 configured to collect the one or more personal electronically encoded items 190 from one or more sources 180 comprising one or more of a cloud 180, a cellular phone 180, a mobile electronic device 180, a personal computer 180, the internet 180, a network 180, a tablet 180, a digital camera 180, a camera 180, a digital video camera 180, a video camera 180, a digital sound recorder 180, a sound recorder 180, and a tape recorder 180.

Embodiment 20 is directed to embodiment 15, wherein the one or more personal electronically encoded items 190 comprise one or more digital photographs 190, analog photographs 190, digital videos 190, analog videos 190, digitally encoded sound files 190, analog encoded sound files 190, written documents 190, and/or emails 190.

Embodiment 21 is directed to embodiment 15, further comprising a tagging module 130a configured to automatically tag one or more of the one or more personal electronically encoded items 190 with one or more keywords 310.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for managing electronically encoded items on an electronic device, comprising:
   using a processor device operably coupled with a database, performing:
   analyzing a user's own personal electronically encoded items associated with a previously created category representing a first personal area of user interest identified by a user to discover similarities among the personal electronically encoded items from which a new category can be proposed;
   providing a proposal to the user for creation of the new category with which to associate at least one of the personal electronically encoded items, the proposal based on the similarities determined from the analysis, and a probability model trained by the user's interactions with the personal electronically encoded items;
   creating the new category representing a second personal area of user interest, responsive to user acceptance of the proposal;
   responsive to a user decision to cluster the previously created category with the new category as an individual entity within the new category, associating the previously created category with the new category by migrating tags from the new category to the associated previously created category and to the personal electronically encoded items of the associated previously created category, the migration of the tags based on child-parent relationships;
   monitoring the user's acceptance/rejection of the proposal; and
   modifying criteria used in making future proposals, based on the user's acceptance/rejection of proposals, wherein modifying the criteria comprises modifying the probability model.

2. The method as recited in claim 1, wherein modification of the probability model is performed automatically.

3. The method as recited in claim 1, wherein the personal electronically encoded items are stored within albums in the database.

4. The method as recited in claim 1, further comprising:
   collecting the personal electronically encoded items from at least one source selected from a group consisting of: a cellular phone, a mobile electronic device, a personal computer, a tablet, a digital camera, a camera, a digital video camera, a video camera, a digital sound recorder, a sound recorder, and a tape recorder.

5. The method as recited in claim 1, wherein the personal electronically encoded items comprise an item selected from a group consisting of: digital photographs, analog photographs, digital videos, analog videos, digitally encoded sound files, and analog encoded sound files.

6. The method as recited in claim 1, further comprising automatically tagging one or more of the personal electronically encoded items with one or more keywords.

7. The method of claim 1 further comprising associating a probability model with each category.

8. A non-transitory computer-readable medium having computer-executable instructions stored thereon for causing a computer comprising a processor and associated memory to carry out a method for managing electronically encoded items, the method comprising:
   analyzing a user's own personal electronically encoded items associated with a previously created category representing a first personal area of user interest identified by a user to discover similarities among the personal electronically encoded items from which a new category can be proposed;
   providing a proposal to the user for creation of a new category with which to associate at least one of the personal electronically encoded items, the proposal based on similarities determined from the analysis, and a probability model trained by the user's interactions with the personal electronically encoded items;
   creating the new category representing a second personal area of user interest, responsive to user acceptance of the proposal;
   responsive to a user decision to cluster the previously created category with the new category as an individual entity within the new category, associating the previously created category with the new category by migrating tags from the new category to the associated previously created category and to the personal electronically encoded items of the associated previously created category, the migration of the tags based on child-parent relationships;
   monitoring the user's acceptance/rejection of the proposal; and
   modifying criteria used in making future proposals, based on the user's acceptance/rejection of proposals, wherein modifying the criteria comprises modifying the probability model.

9. The non-transitory computer-readable medium as recited in claim 8, wherein modification of the probability model is performed automatically.

10. The non-transitory computer-readable medium as recited in claim 8, wherein the personal electronically encoded items are stored within albums in a database.

11. The non-transitory computer-readable medium as recited in claim 8, the method further comprising:
collecting the personal electronically encoded items from at least one source selected from a group consisting of: a cellular phone, a mobile electronic device, a personal computer, a tablet, a digital camera, a camera, a digital video camera, a video camera, a digital sound recorder, a sound recorder, and a tape recorder.

12. The non-transitory computer-readable medium as recited in claim 8, wherein the personal electronically encoded items comprise at least one item selected from a group consisting of: digital photographs, analog photographs, digital videos, analog videos, digitally encoded sound files, and analog encoded sound files.

13. The non-transitory computer-readable medium as recited in claim 8, the method further comprising automatically tagging one or more of the personal electronically encoded items with one or more keywords.

14. The non-transitory computer-readable medium of claim 8, wherein the method for managing electronically encoded items further comprises associating a probability model with each category.

15. A virtual assistant for managing electronically encoded items, comprising:
a processor operably coupled with a memory;
an analysis module configured to analyze a user's own personal electronically encoded items associated with a previously created category representing a first personal area of interest identified by a user to discover similarities among the personal electronically encoded items from which a new category can be proposed;
a probability module configured to:
develop and modify a probability model trained by the user's interactions with the personal electronically encoded items; and
modify criteria used in making future proposals, based on the user's acceptance/rejection of proposals, wherein modifying the criteria comprises modifying the probability model;
a proposal module configured to provide a proposal to the user for creation of a new category with which to associate at least one of the personal electronically encoded items, the proposal based on similarities determined from the analysis, and the probability model;
a user control module configured to create the new category representing a second personal area of user interest, responsive to user acceptance of the proposal;
an association and migration module configured to associate the previously created category with the new category by migrating tags from the new category to the associated previously created category and to the personal electronically encoded items of the associated previously created category, responsive to a user decision to cluster the previously created category with the new category as an individual entity within the new category, the migration of the tags based on child-parent relationships; and
a system control module configured to monitor the user's acceptance/rejection of the proposal.

16. The virtual assistant as recited in claim 15, wherein modification of the probability model is performed automatically.

17. The virtual assistant as recited in claim 15, wherein the personal electronically encoded items are stored within albums in a database.

18. The virtual assistant as recited in claim 15, further comprising:
a collection module configured to collect the personal electronically encoded items from at least one source selected from a group consisting of: a cellular phone, a mobile electronic device, a personal computer, a tablet, a digital camera, a camera, a digital video camera, a video camera, a digital sound recorder, a sound recorder, and a tape recorder.

19. The virtual assistant as recited in claim 15, wherein the personal electronically encoded items comprise at least one item selected from a group consisting of: digital photographs, analog photographs, digital videos, analog videos, digitally encoded sound files, and analog encoded sound files.

20. The virtual assistant as recited in claim 15, further comprising a tagging module configured to automatically tag at least one of the personal electronically encoded items with one or more keywords.

21. The virtual assistant of claim 15 wherein the probability module is further configured to associate a probability model with each category.

* * * * *